(12) United States Patent
Siegel

(10) Patent No.: US 10,780,387 B1
(45) Date of Patent: Sep. 22, 2020

(54) SYSTEM AND METHOD FOR GAS QUALITY AND EFFICIENCY OF A PRESSURE SWING ADSORPTION GAS SEPARATION UNIT

(71) Applicant: ARC Technologies Corp., Yukon, PA (US)

(72) Inventor: Stanley Michael Siegel, Yukon, PA (US)

(73) Assignee: ARC TECHNOLOGIES CORP., Yukon, PA (US)

( * ) Notice: Subject to any disclaimer, the term of this patent is extended or adjusted under 35 U.S.C. 154(b) by 0 days.

(21) Appl. No.: 16/894,520

(22) Filed: Jun. 5, 2020

(51) Int. Cl.
B01D 53/047 (2006.01)
B01D 53/26 (2006.01)
B01D 53/04 (2006.01)
B01D 53/053 (2006.01)

(52) U.S. Cl.
CPC ....... *B01D 53/047* (2013.01); *B01D 53/0454* (2013.01); *B01D 53/0476* (2013.01); *B01D 53/053* (2013.01); *B01D 53/261* (2013.01); B01D 2253/102 (2013.01); B01D 2256/16 (2013.01); B01D 2256/245 (2013.01); B01D 2257/102 (2013.01); B01D 2257/104 (2013.01); B01D 2257/504 (2013.01)

(58) Field of Classification Search
CPC .. B01D 53/047; B01D 53/261; B01D 53/053; B01D 53/0476; B01D 53/0454; B01D 2253/102; B01D 2256/16; B01D 2256/245; B01D 2257/102; B01D 2257/504; B01D 2257/104

USPC ............ 95/96–98, 117, 136, 139, 141, 143; 96/121, 122, 132, 134; 585/820
See application file for complete search history.

(56) References Cited

U.S. PATENT DOCUMENTS

| | | | | |
|---|---|---|---|---|
| 4,000,990 A | * | 1/1977 | Bingham | B01D 53/0476 95/103 |
| 4,770,676 A | * | 9/1988 | Sircar | B01D 53/0462 95/101 |
| 4,913,709 A | * | 4/1990 | Kumar | B01D 53/0476 95/100 |
| 7,550,030 B2 | * | 6/2009 | Kumar | B01D 53/0476 95/101 |
| 8,211,211 B1 | * | 7/2012 | Knaebel | B01D 53/75 95/96 |
| 2012/0276616 A1 | * | 11/2012 | Siegel | C10L 3/103 435/262 |

* cited by examiner

*Primary Examiner* — Frank M Lawrence, Jr.

(57) ABSTRACT

The invention provides a system and method that applies novel algorithms and compositions for efficiently adjusting compression, unit turn down, pressure and flows of a pressure swing adsorption unit. The present invention also reduces overall horsepower, increases unit's product gas recovery, maximizes product gas quality and allows for non-disturbance of upstream and downstream equipment in regard to pressure and flow oscillations. Raw gas streams addressed include methane (CH4), nitrogen (N2), oxygen (O2), carbon dioxide (CO2), water (H2O), Hydrogen Sulfide (H2S) and non-methane organic compounds (NMOC) gases/vapors. The invention incorporates a CO2 and H2O trim units and provides a VPSA N2 and O2 rejection section.

15 Claims, 3 Drawing Sheets

FIG #2

SYSTEM AND METHOD FOR GAS QUALITY AND EFFICIENCY OF A PRESSURE SWING ADSORPTION GAS SEPARATION UNIT

FIELD OF THE INVENTION

The present invention relates generally to pressure swing adsorption systems for gas separation of includes at least methane (CH4), nitrogen (N2), oxygen (O2), carbon dioxide (CO2), water (H2O), Hydrogen Sulfide (H2S) and non-methane organic compounds (NMOC) gases/vapors. More specifically, embodiments disclosed herein relate to methods and system for controlling the gas quality, compression, gas flow, and gas pressure over the entire gas processing plant.

BACKGROUND OF THE INVENTION

Pressure Swing Adsorption (PSA) and Vacuum Pressure Swing Adsorption (VPSA) with their compression, decompression and additional gas quality trim units make up a complete PSA Unit/system (PSA UNIT). The reality of PSA & VPSA swing of gas pressures and gas flows create a large disturbance in the overall gas processing plant. The purpose of VPSA, PSA, Gas Quality Trim Units and the final PSA UNIT system as a whole is for the separation of gases by selectively adsorbing targeted compounds. By doing so, an end purified product is created which complies to a commercial speciation.

Prior Art shows problems created by these units are many, including but limited to the following major problems:
- Poor product gas quality and quantity from upstream and downstream plant equipment caused by pressure and flow osculation generated by a VPSA SECTION in a gas processing system.
- Poor utilization of a PSA UNIT's adsorbent material bed
- Poor PSA UNIT turndown in regard to variable flow rates from upstream gas flow.
- Under sizing of upstream and downstream plant equipment and compression because of overlooking a poor PSA UNIT design due to oscillating gas flows and gas pressures.
- Poor product gas quality and quantity from a PSA UNIT because of oscillation caused by upstream and downstream plant equipment compounding the production errors in gas quality and gas quality.
- Increasing the CAPX price of the plant because of unseen problems with an underperforming PSA UNIT
- PSA UNIT incapability with the process control system, delaying the commissioning date of plant completion, resulting in penalties and lost production.
- PSA UNIT gas oscillation causing inability to adding gas trim sections to the PSA UNIT to allow for removal of small amounts of unwanted gases that are regarded as contamination before and after the gas separation VPSA section.

The present invention at minimum solves these problems and enhances the resulting over-all gas processing plant.

DETAIL DESCRIPTIONS OF THE INVENTION

All illustrations of the drawings are for the purpose of describing selected versions of the present invention and are not intended to limit the scope of the present invention. Prior art may attain a simplification in the total number of valves used relative to a PSA unit's process but does not address the overall problems and goals herein, which the present invention addresses.

Figure 2:
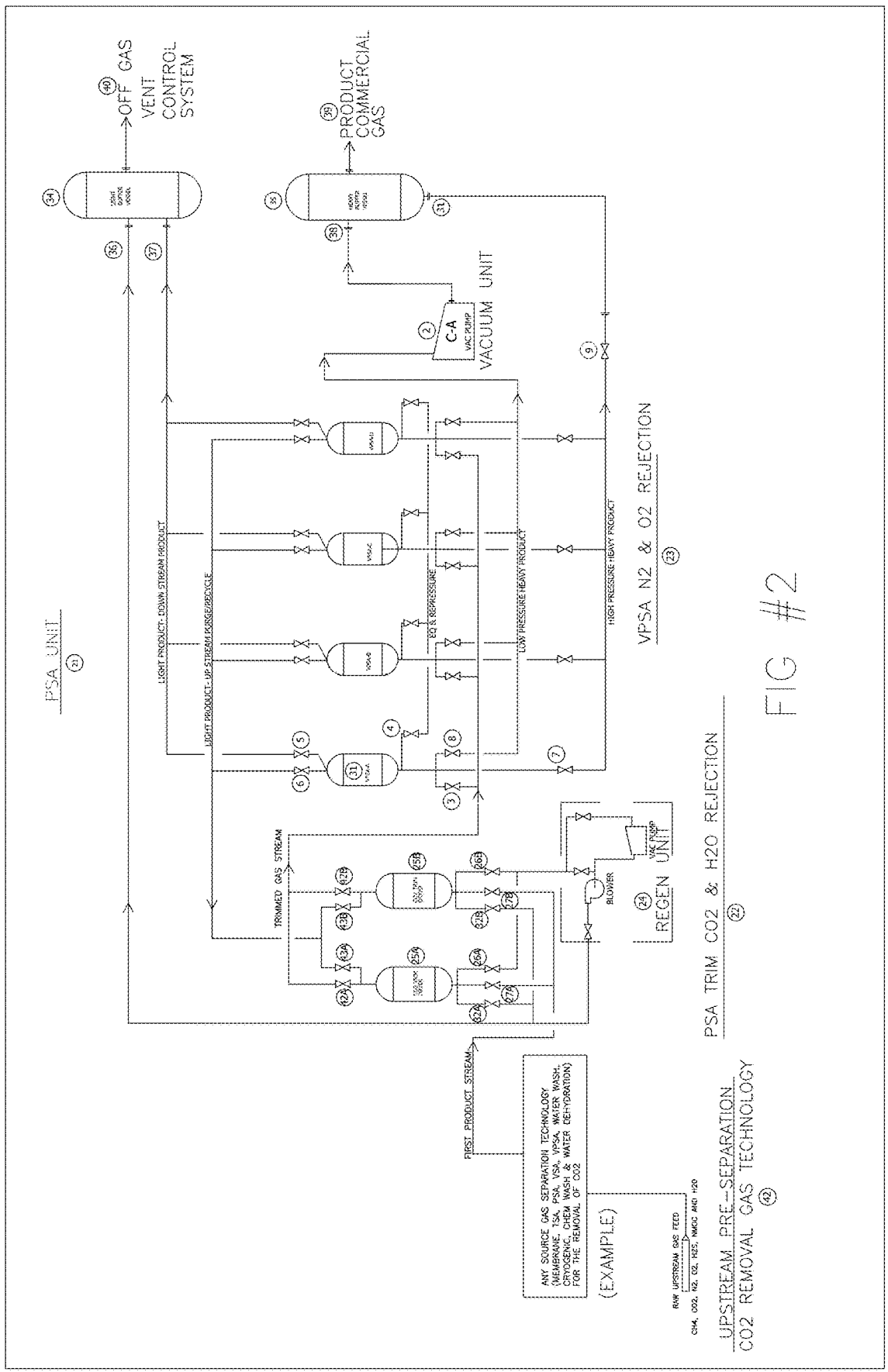
FIG. 2 is a second diagram illustrating the present invention.

FIG. 2 the best mode of the present invention, PSA Unit (21) starts with receiving raw methane (CH4), nitrogen (N2), oxygen (O2), carbon dioxide (CO2), water (H2O), Hydrogen Sulfide (H2S) and non-methane organic compounds (NMOC) into the pre-separation section (42) treating H2S, NMOC and partially treating CO2, H2O. Next the first product gas stream exiting this pre-separation section (42) and enters the PSA Trim section (22) where further removal of CO2 and H2O is applied to reduce H2O dewpoint to <−40 Deg C. and or reduce CO2 mole percentage weight to <1%, this produced Trimmed gas stream now enters the N2/O2 VPSA separation unit (23) producing the end commercial product stream (39). This section also produces an off-gas stream (40).

Figure 1:
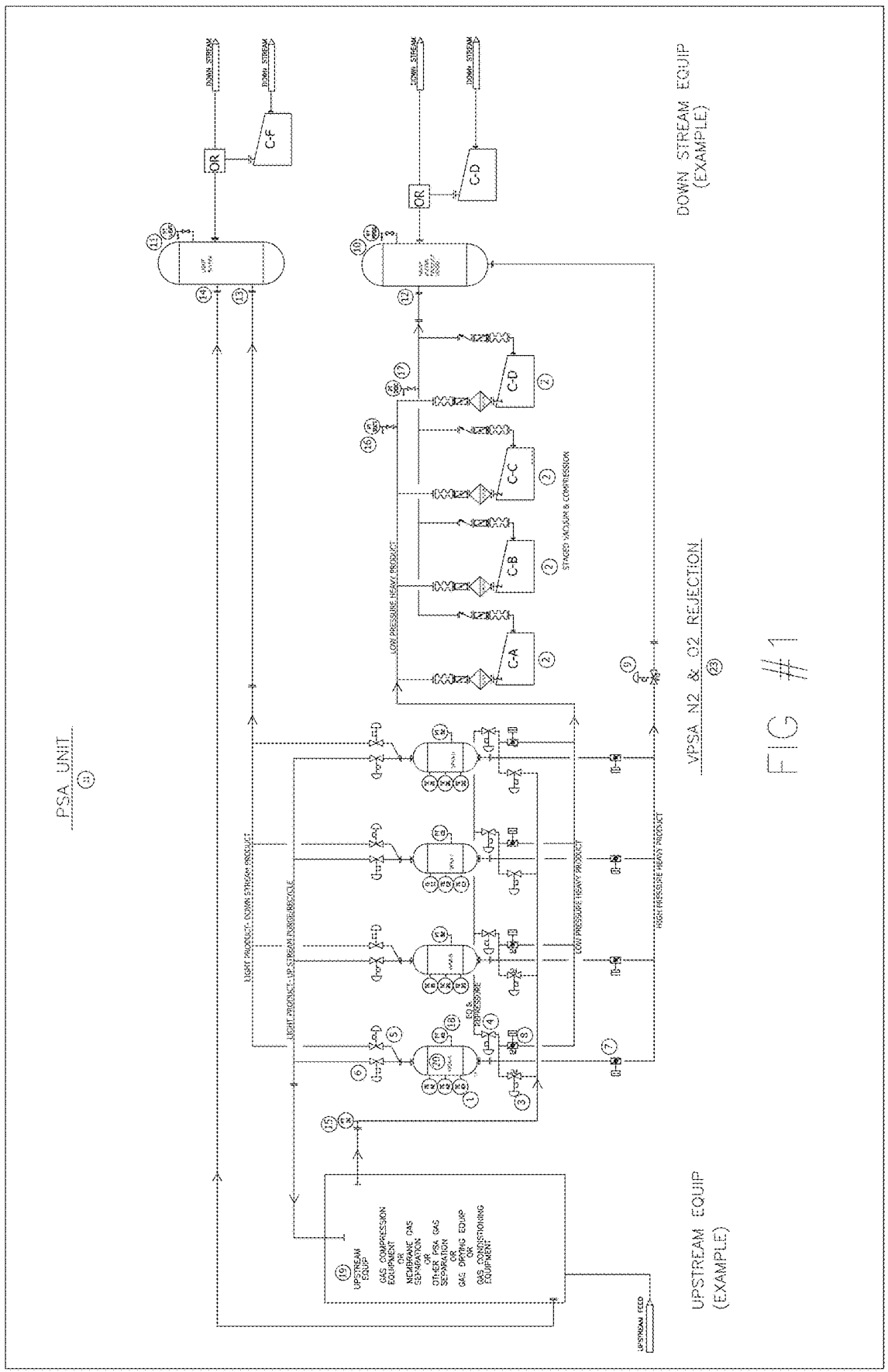
FIG. 1 is a first diagram illustrating the present invention.

The present invention relates to the efficiency control of the VPSA Unit (21) FIG. 1 that contains two or more vessels in parallel; along with all the associated gas handling units (valving, compression equipment, buffering vessels, controls, and instrumentation) arranged in an over-all gas processing plant. The VPSA vessels (20) in FIG. 1 has a light product stream that does not get adsorbed by the adsorbent material and a heavy gas product stream which does gets adsorbed by the material. The heavy product stream being methane (CH4) and the light product stream being N2 and O2.

Figure 3:
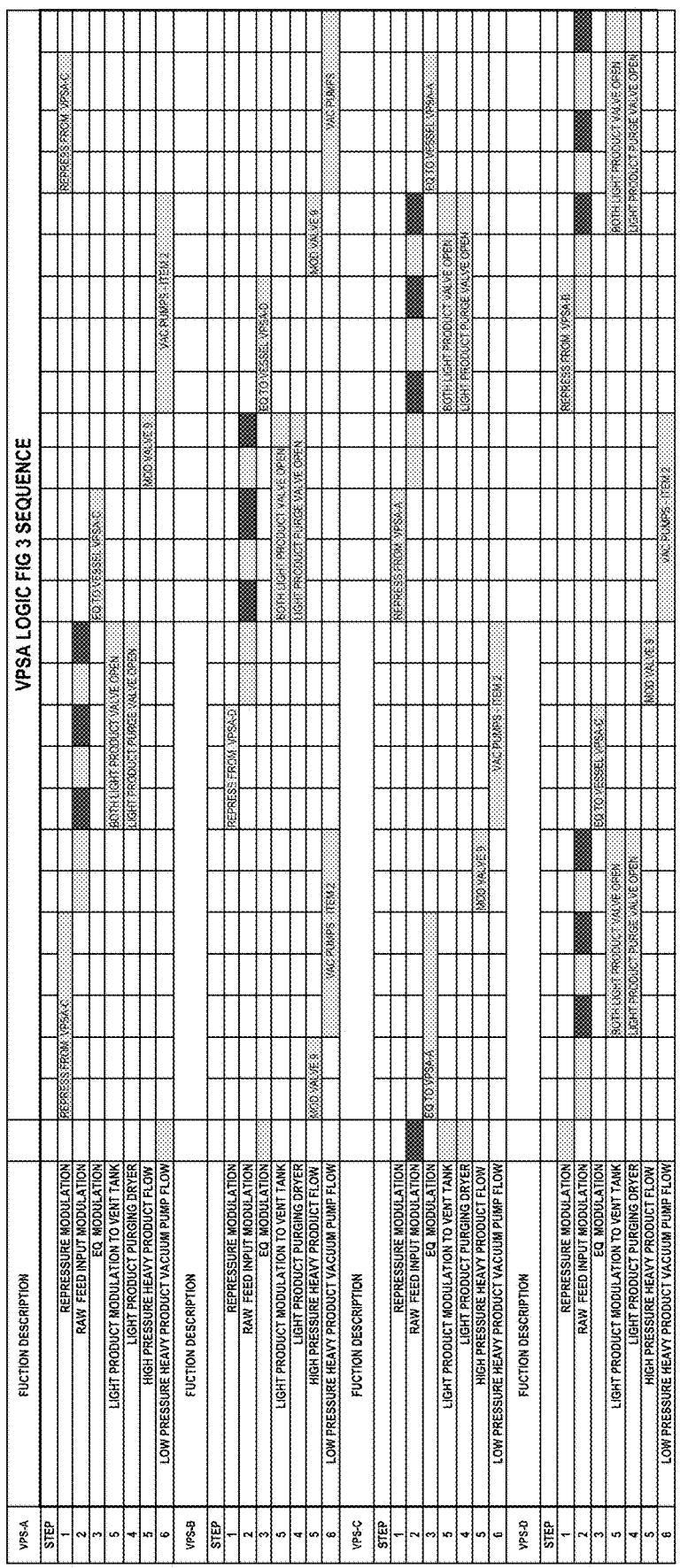
FIG. 3 is a third diagram illustrating the present invention.

One aspect of the embodiments disclosed herein relates to the VPSA section (23) full use of the adsorbent material (closely looking at heavy product gas break through) by the added arrangement of temperature probes that senses the heat of adsorption. One or more staged temperature probes (1) in FIG. 1 are used by the VPSA unit's (21) Programmable Logic Controller (PLC) to synchronize the inlet feed, equalization, exhausting, regeneration, valving with the staged compression and gas buffering schema. The added arrangement of at least one temperature probe working directly with the control algorithms which reduces the overall adsorbent material needed in VPSA vessel (20) FIG. 1, reduces gas pressure oscillations and gas flow oscillations results in energy savings and increases the efficiency of the entire gas processing system. When adsorbent material in VPSA vessel (20) is used to its fullest, the VPSA vessel (20) cycle time is lengthened, resulting in less cycling of valves and less oscillation in the overall plant process and system. Logic sequencing chart FIG. 3 shows the switching point element starting point after equalization, followed by pre-temperature limit setting and finally the valve shutdown sequence (close valve) ending the adsorption step. FIG. 3 chart also incorporates an optional PSA trim unit (22) FIG. 2 upstream of the VPSA gas separation section (23).

FIG. 1, another aspect of the embodiments disclosed herein relates the VPSA Section (23), incorporating one extra analog control valve (9) separate from any Prior Art. This control valves works in conjunction with pressure sensor (18) (10) in the VPSA Section (23) with VPSA vessels (20) and heavy product gas buffer vessel at pressure sensor (10). The added arrangement of this one analog control valve (9) working directly with the control algorithms which reduces overall gas pressure oscillations and gas flow oscillations resulting in energy savings and efficiency of the entire gas processing plant. Analog control valve (9) uses both pressure sensor (18) and pressure sensor (10) as its control point allowing only reasonable amount of gas flow and pressure drop so not to over pressure or under pressurize product pressure (10), not to allow excess flow and pressure loss from VPSA vessel (20) at sensor (18), which could damage the vessel's (20) adsorbent material. This dual control arrangement ensures proper pressure in both the VPSA vessel (20) and the heavy product buffer vessel at pressure sensor (10). This arrangement reduces the overall plant oscillations in gas flow and gas pressure of the system. The dynamics of the system with this embodiment will produce a steady pressure rate in buffer vessel at pressure sensor point (10) using logic shown in FIG. 3.

The present invention's embodiment of FIG. 1 takes gas into the VPSA Section (23) at inlet conduit connection shown at pressure sensor (15). Here the VPSA section (23) receives its gas pressure and gas flow from upstream equipment (19). It is desirable to maintain constant pressure and gas flow in the upstream equipment (19), allowing the equipment to maintain gas quality and maximizing equipment performance. The present invention incorporates a novel control schema using control logic, modulating analog control valve (3) and pressure sensor (15) to prioritizing the upstream stability of gas pressure sensor (15). This arrangement establishes a variable flow in gas pressure sensor (15) conduit, allowing downstream stages of the PSA Unit (23) to control their modulating analog control valves (4)(6)(5) in the same behavior. This also holds true of the control valve (43A)(43B) in FIG. 2 which will stabilize upstream gas pressures, allowing variable flow from these upstream units. Furthermore, the present invention makes the PSA UNIT (21) a back-pressure control device for the upstream equipment (19) and also addresses the downstream pressure and flow needs. The VPSA UNIT (23) hence has a variable gas flow pressurization feature allowing increase and decreases in pressure and stabilizing up steam's equipment process variables. FIG. 1 pressure sensor (18) and temperature sensor (1) are also used to sense when the VPSA vessel (20) is up to light product pressure and temperature, to open modulating valves (4)(6)(5), shown in logic sequencing FIG. 3. When up-stream gas flows are low at conduit connection shown at pressure sensor (15), the VPSA Section (23) will automatically compensate for this turn-down in the process flow by venture of this embodiment arrangement shown herein allowing for a novel approach in solving two problems, inlet gas buffering and unit turn-down. Using an on-demand vacuum/compression approach regarding the use of a time, pressure sensors (10)(18)(11), and temperature sensors (1), smaller higher efficiency vacuum/compression units (2) are used allowing for reducing or increasing gas flow capacity without sacrificing gas quality. FIG. 3 holds a logic sequencing chart containing all main control functions and their dependences in regard to actuation and modulation.

Another aspect shown in FIG. 2, disclosed herein relates the present invention's novel algorithm that allows for implantation of the invention's ability to adding gas trim units (22) to the PSA UNIT (21) to allow for removal of small amounts of unwanted gases that are regarded as contamination before the gas separation VPSA section (23). This endowment is only possible because of the invention's flexibility described herein and shown in FIG. 1, FIG. 2 and FIG. 3.

FIG. 1 shows an upstream optional equipment (19) which includes a Gas drying and other gas PSA separation equipment; FIG. 2 expands on giving another embodiment of the present invention. FIG. 2, in conjunction with core N2/O2 removal VPSA section (23), the present PSA UNIT (21) invention relates to the efficiency control of an added Trim Unit (22) having two or more vessels in parallel (25A)(25B); along with the gas regeneration unit (24) and the associated gas handling (valving, compression equipment, buffering vessels, controls, and instrumentation) arranged in an overall gas processing plant. As stated above, FIG. 3 logic table incorporates this add-on trim unit for the removal of CO2 and H2O. Furthermore, in FIG. 2, raw Gas containing CH4, CO2, N2, O2, NMOC and H2O are treated by a typical gas removed/reject Technology (42). Here the gas product from this technology still has a small percentage of undesirable CO2 (=>1%) and H2O (=>-40 Deg C. dewpoint) which is delivered to the present invention's trim unit (22). Either vessel (25A)(25B) is on line to accept the gas for additional treatment with both vessels containing one or more adsorbent materials having an adsorbent sensitive to water and to CO2; the material has a non-adsorbent sensitivity for CH4.

FIG. 2, the adsorbent material contained in vessel (25A)(25B) takes-up H2O and or CO2 until it becomes saturated then the material needs regenerated. Regeneration takes place after the new vessel (25A) or (25B) is switched on-line. The switching on-line process uses an equalization arrangement between two or more vessels (25) to reduce pressure disturbances. The spent vessel (25A) or (25B) must be regenerated, pressure is lowered and vented to Light Buffer Vessel (34) via valve (32) and conduit (36). This vessel (25) in regeneration is presented with dry purge gas cycle via valves (43)(6) being open for a predetermined time with valve (32) opened to the light product vessel (34). Once the predetermined time has ended, the regeneration cycle will enter its final vacuum regeneration. Regen unit (24) blower removes gas and lowers gas pressure enough in PSA vessel (25) which enables the Regen unit (24) vacuum pump to come on-line to fully remove the adsorbed CO2 and H2O from the adsorbent material. When using only H2O adsorbent material in vessel (25) for targeting only water removal allows Regen unit (24) to be omitted using only the dry gas purge described above (purge dry cycle via (6)(43)(32) valves).

FIG. 2, during the entire trim process, the N2 & O2 rejection unit (23) is processing gas and providing dry CO2 free purge gas to the vessel (25) in regeneration. The adsorbent material contained in N2/O2 vessels (31) has an adsorbent sensitive to methane (CH4) and is non-adsorbent sensitive to N2 and O2 for the proper pass-through removal of large amounts of N2 and O2 from a gas mixture. The N2 and O2 contaminates are removed via purge through purge valve (5) via conduit (37) and/or through Regen vessel (25) including valve (6)(32)(43) and conduit (36). The light product gas (40) exits vessel (34) to a vent control system.

A FIG. 2, after an equalization process via valve (4), the commercial product gas from the VPSA Section (23) leaves the system via high pressure product valve (7) to the commercial product vessel (35) via control valve (9) and conduit (31). Once pressure is lowered, vacuum pump (41) comes on-line and commercial product is delivered to commercial product vessel (35) via control valve (8) and conduit (38).

FIG. 1 another aspect, embodiments disclosed herein relates the VPSA UNIT's (23) incorporating the VPSA vessel's (20) light product control valves (5) & (6) separate from any Prior Art. These control valves work in conjunction with pressure sensors (11)(18) in the VPSA UNIT's (23) VPSA vessels (20), and the light product buffer vessel at pressure sensor (11). The novel arrangement of both valves (5) & (6) working directly with the control algorithms which reduces overall gas pressure oscillations and gas flow oscillations resulting in energy saving and efficiency of the entire gas processing plant. Using valves (5) and or (6) with pressure sensor (18) and pressure sensor (11) as its control point allowing only reasonable amount of gas flow and pressure drop so not to over pressure the light product buffer vessel pressure (11) and not to allow excess flow and pressure loss from VPSA vessel (20) at sensor (18), which could damage the vessel's (20) adsorbent material. This dual control arrangement ensures proper pressure in both the VPSA and the product buffer vessel at pressure sensor (11) and also supplies upstream dry CO2 free purge gas for the system. This arrangement reduces the overall plant oscillations in gas flow and gas pressure of the system.

FIG. 1, high compression equipment turndown capability is another aspect disclosed herein relates the PSA UNIT (21), incorporating a high turndown capability far greater than any Prior Art's capabilities. Using an on-demand vacuum/compression approach regarding the use of a time and temperature sensor (1) elements; smaller higher efficiency vacuum/compression units (2) are used allowing for reducing or an increasing gas flow capacity without sacrificing gas quality. The present invention teaches this novel schema that again further reduces overall gas flow oscillations resulting in energy saving and efficiency of the entire gas system. As the time increases to activate temperature sensor (1) set point that the adsorbent material in VPSA vessel (20) has reached its fullest adsorption level of heavy product; this long-time element indicates a low heavy gas product flow condition. The present invention then reduces to a lower capacity level by shutdown one or more vacuum/compression units (2). Likewise, as the time decreases to activate temperature sensor (1) set point indicating higher heavy gas product flow, the present invention adds (starts) one or more vacuum/compression units (2).

Although the invention has been explained in relation to its preferred embodiment, it is to be understood that many other possible modifications and variations can be made without departing from the spirit and scope of the invention.

What is claimed is:

1. A method for processing and purifying a gas stream comprises:
    collecting a raw gas stream which includes at least methane (CH4), nitrogen (N2), oxygen (O2), carbon dioxide (CO2), water (H2O), Hydrogen Sulfide (H2S) and non-methane organic compounds (NMOC) gases/vapors;
    separating the raw gas stream using H2S and NMOC removal and creating at least one intermediate NMOC and H2S stream, wherein an exiting treated gas stream is enriched in CH4, N2, O2, CO2, H2O, N2 and depleted in NMOC and H2S relative to the raw gas stream;
    further partially separating the treated gas stream using CO2 and H2O removal and creating at least one intermediate CO2 and H2O stream, wherein a new produced first product gas stream is enriched in CH4, N2, O2 and partially depleted in CO2 and H2O relative to the first product gas stream;
    further separating the first product gas stream using at least two PSA vessels that have adsorbent material selective of H2O and or CO2 and creating at least one intermediate CO2 and or H2O stream, wherein a new produced Trimmed stream is enriched in CH4, O2, N2 and depleted in CO2 and H2O relative to the first product gas stream;
    further separating the Trimmed gas stream using at least two Vacuum Swing Adsorption (VPSA) vessels having adsorbent material selective of CH4 and creating a new commercial heavy product stream enriched in CH4 and depleted in N2 and O2 relative to the Trimmed gas stream, directing the produced commercial product gas stream to at least one commercial heavy product buffer vessel and a second produced light gas product stream directed to a purge unit and or a light product buffer vessel;
    providing at least one equalization stream between said VPSA vessels, wherein the equalization stream is enriched in N2 and lightly depleted in CH4 relative to a higher pressurized VPSA vessel's adsorbent gas content;
    sensing at least one gas adsorption temperature in said VPSA vessels, and using sensed increasing gas adsorption temperature to command the end of vessel's adsorption sequence;
    providing at least one purge stream between said PSA vessels and said VPSA vessels, wherein the purge stream is enriched in N2 and O2 and depleted in CH4, CO2 and H2O relative to a lower pressurized upstream PSA vessel with exiting purge flow to a light buffer vessel; and
    providing at least one computerized process schema outputting PID loop outputs, controlling analog valves, and prioritizing and balancing gas pressures and gas flows.

2. The method of claim 1, wherein the first product gas stream comprises at least 1.0 mole percentage weight CO2.

3. The method of claim 1, wherein the first product gas stream comprises H2O dewpoint is greater than −40 Deg C.

4. The method of claim 1, wherein the said PSA vessels use vacuum to regenerate of the adsorbent material.

5. The method of claim 1, wherein said PSA vessel's adsorption material is any material that is selective of H2O and or CO2 and non-selective of CH4.

6. The method of claim 1, wherein that the said VPSA's adsorption material is any material that is selective CH4 and non-selective of N2 and or O2.

7. The method of claim 1, wherein said computerized process schema uses an automated first need algorithm PID loop control elements.

8. The method of claim 7, wherein that the said computer algorithm processes upstream elements as priority in regards to pressure, setpoint and controlling PID to keep system's pressure and flow in balance.

9. The method of claim 7, wherein that the said computer algorithm processes an analog control valve in conjunction with upstream VPSA Vessels and downstream commercial product buffer vessel pressure and flow control to prevent disruption, pressure/flow oscillation in the said processing and purifying a gas stream.

10. The method of claim 7, wherein controlling analog valves in conjunction with upstream Trim unit and downstream light product buffer vessel pressure and flow control to prevent pressure/flow disruption oscillation in the processing and purifying a gas stream.

11. A system for processing and purifying a gas stream comprises:
    A raw gas stream piping flow network to convey at least methane (CH4), nitrogen (N2), oxygen (O2), carbon dioxide (CO2), water (H2O), Hydrogen Sulfide (H2S) and non-methane organic compounds (NMOC) gases/vapors;
    a raw gas separation unit for H2S and NMOC removal, and creating at least one intermediate NMOC and H2S stream, wherein the exiting treated gas stream is enriched in CH4, N2, O2, CO2, H2O and depleted in NMOC and H2S relative to the raw gas stream;

a treated gas separation unit for CO2 and H2O removal and creating at least one intermediate CO2 and H2O stream, wherein the new produced first product gas stream is enriched in CH4, N2, O2, N2 and partially depleted in CO2 and H2O relative to the exiting treated gas stream;

a Trim unit to separate the first product gas stream using at least two PSA vessels having adsorbent material selective of H2O and or CO2 and creating at least one intermediate CO2 and or H2O stream, wherein a new Trimmed product stream is enriched in CH4, O2, N2 and depleted in CO2 and H2O relative to the first product gas stream;

a VPSA gas separation unit to produce a commercial product gas stream using at least two Vacuum Swing Adsorption (VPSA) vessels having adsorbent material selective of CH4 and wherein creating a new commercial product stream enriched in CH4 and depleted in N2 and O2 relative to the Trimmed stream;

at least one equalization conduit between said VPSA vessels, wherein an equalization stream is enriched in N2 and lightly depleted in CH4 relative to higher pressurized VPSA vessel's adsorbent gas content;

at least one gas temperature sensor in said VPSA vessels, sensing gas adsorption temperature flow and using increasing temperature values to command an end of said vessel's adsorption sequence;

at least one purge conduit between said Trim Unit and said VPSA vessels, wherein a purge stream is enriched in N2 and O2 and depleted in CH4, CO2 and H2O relative to a lower pressurized PSA vessel; and at least one computer with a process analog valve for prioritizing and balancing gas pressures and gas flow.

12. The system of claim 11, further comprising a first gas conduit connecting pretreatment units to said Trim unit.

13. The system of claim 11, further comprising a vacuum regeneration unit within said Trim Unit.

14. The system of claim 11, wherein the said gas separation unit (VPSA) has at least one Light Product Buffer vessel and at least one Heavy Product Buffer vessel.

15. The system of claim 11, wherein the said at least one computer has associated logic and an analog valve network.

* * * * *